United States Patent [19]

Seki

[11] Patent Number: 4,985,920
[45] Date of Patent: Jan. 15, 1991

[54] INTEGRATED CIRCUIT CARD

[75] Inventor: Junji Seki, Ebina, Japan

[73] Assignee: Fujitsu Limited, Kawasaki, Japan

[21] Appl. No.: 313,184

[22] Filed: Feb. 21, 1989

[30] Foreign Application Priority Data

Feb. 20, 1988 [JP] Japan .................. 63-038078
Jun. 22, 1988 [JP] Japan .................. 63-154014

[51] Int. Cl.⁵ .................. G06K 19/00; H04L 9/06
[52] U.S. Cl. .................. 380/23; 380/24;
380/25; 380/29; 340/825.31; 340/825.34;
235/379; 235/380
[58] Field of Search .................. 380/23–25,
380/29, 30; 364/200, 900; 235/375, 379, 380,
436; 360/2; 340/825.31, 825.34

[56] References Cited

U.S. PATENT DOCUMENTS

| | | | |
|---|---|---|---|
| 4,529,870 | 7/1985 | Chaum | 235/380 |
| 4,575,621 | 3/1986 | Dreifus | 235/380 |
| 4,672,182 | 6/1987 | Hirokawa | 235/436 |
| 4,697,072 | 9/1987 | Kawana | 235/380 |
| 4,827,512 | 5/1989 | Hirokawa et al. | 380/23 |

FOREIGN PATENT DOCUMENTS 0100981 6/1984 Japan .
0065388 4/1985 Japan .
62-251991 11/1987 Japan .

OTHER PUBLICATIONS

"Fujitsu Card System" by Fujitsu Limited, Aug. 1982.
"Japanese Contribution to the TC68/SC5/WG5" Meeting in Amsterdam, Jun. 4, 1986.

Primary Examiner—Stephen C. Buczinski
Assistant Examiner—Bernarr Earl Gregory
Attorney, Agent, or Firm—Staas & Halsey

[57] ABSTRACT

An integrated circuit (IC) card is provided with an external memory having a much larger memory capacity than that of a usual internal memory packaged inside the IC card together with a processor. The external memory can be managed only by the processor through an external IC card accepted by a terminal machine.

26 Claims, 26 Drawing Sheets

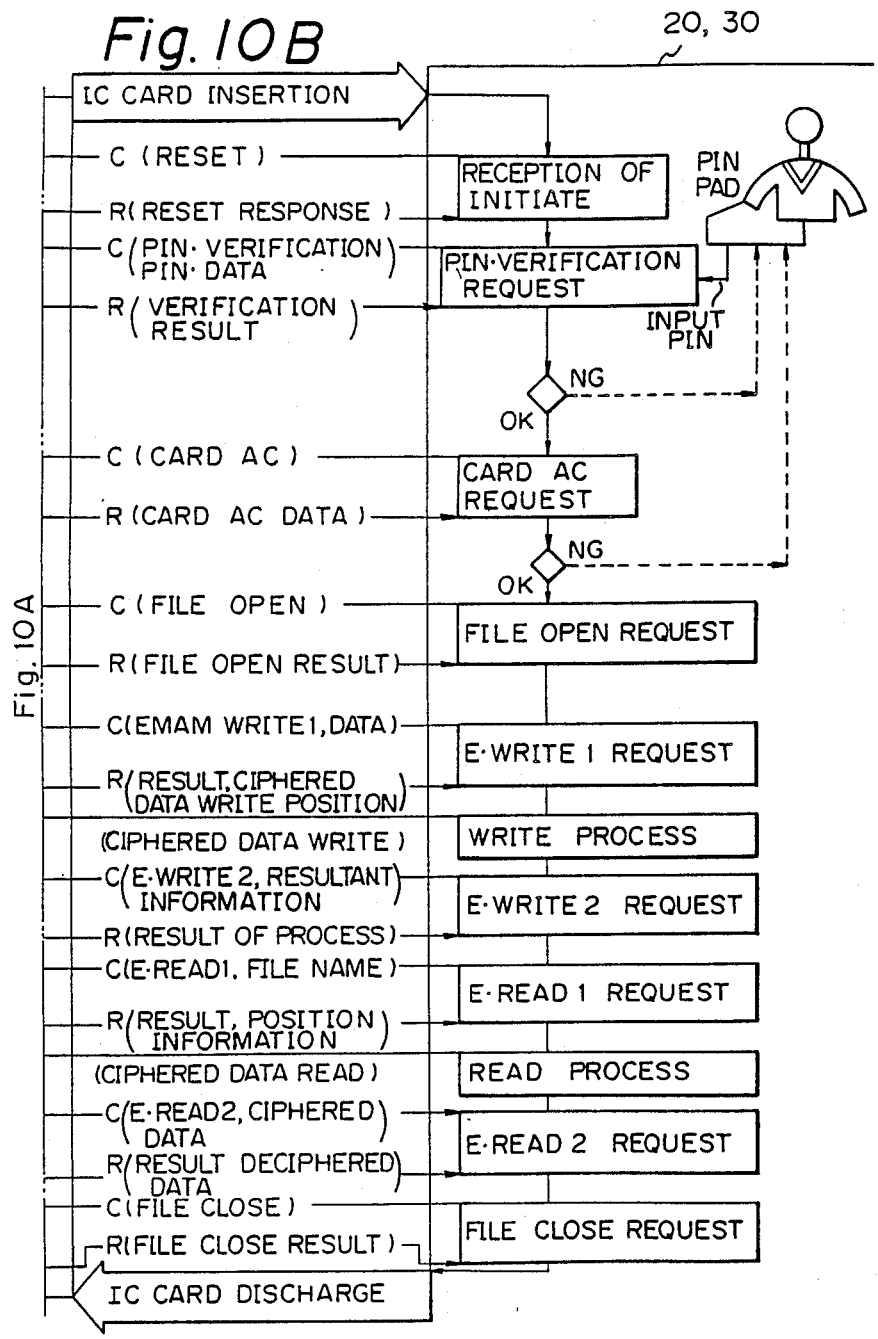

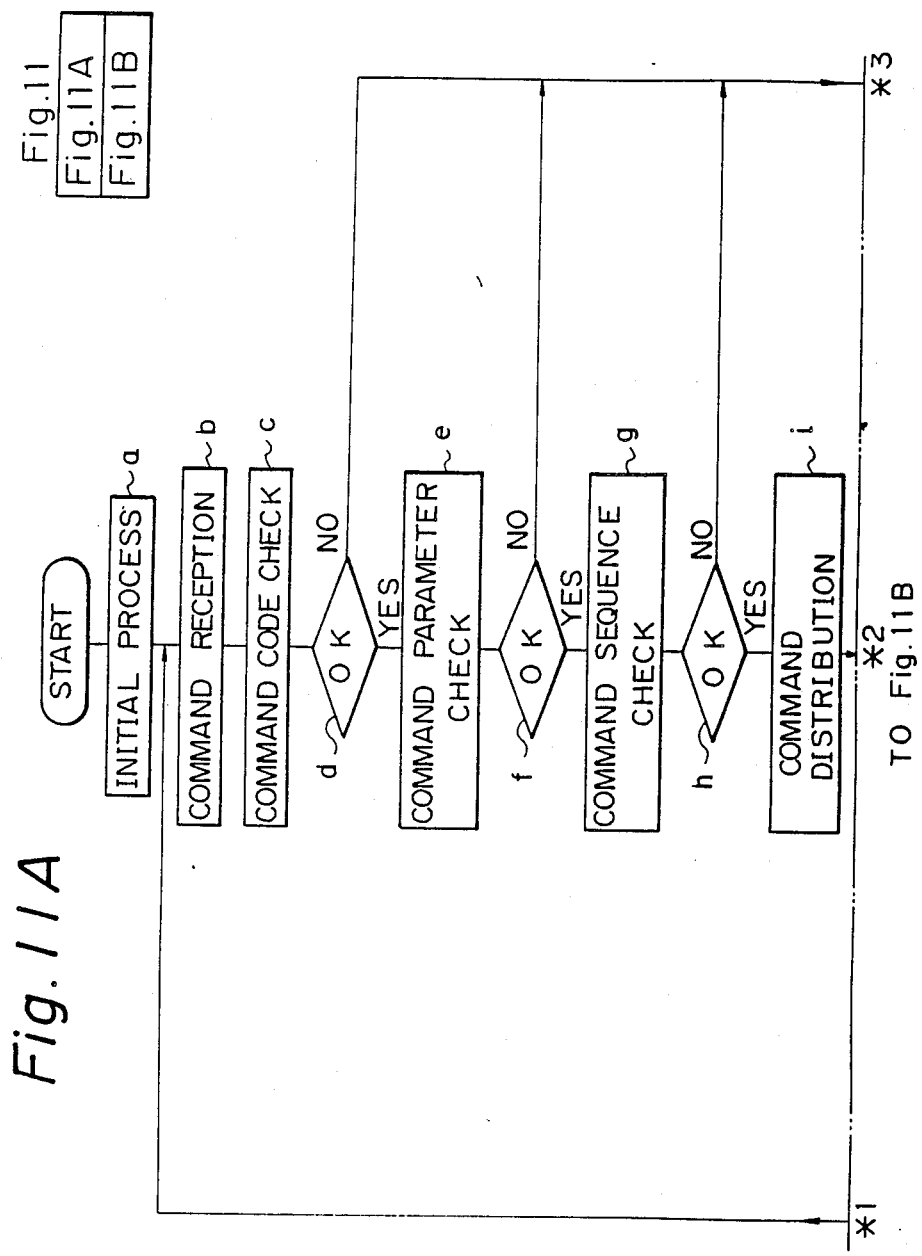

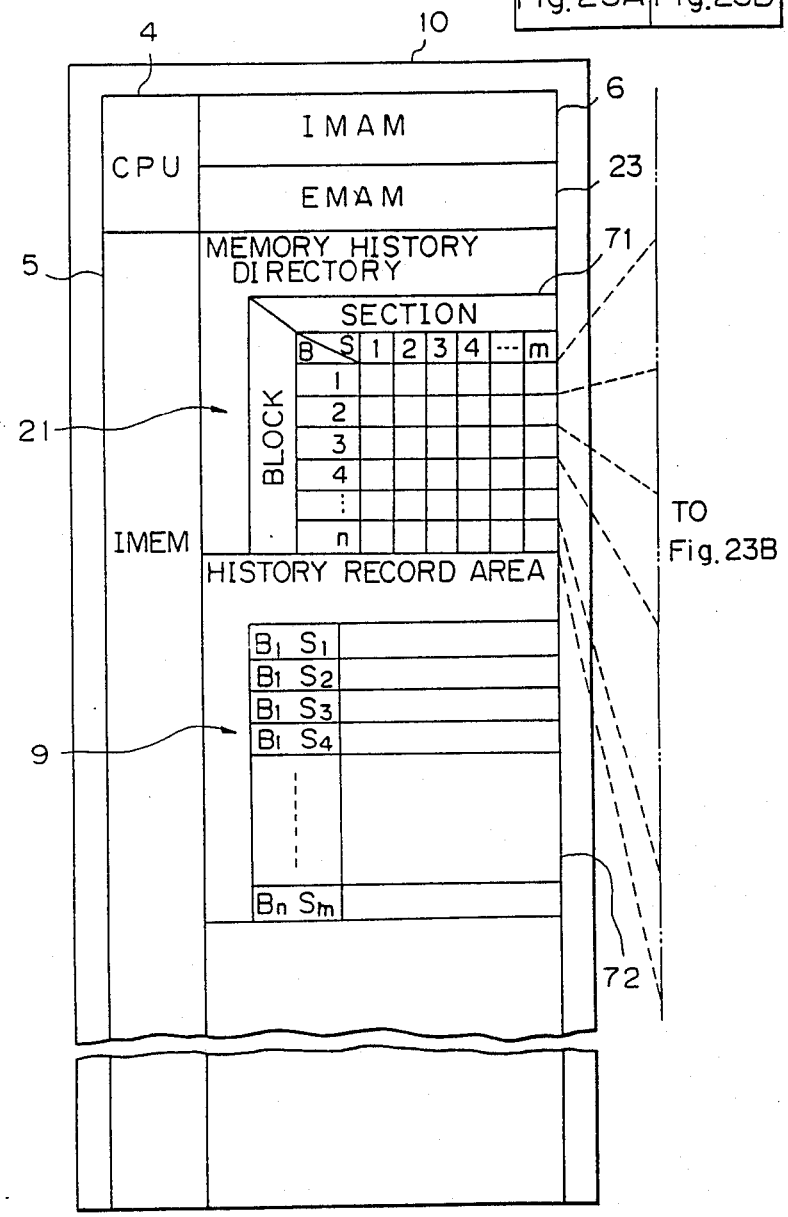

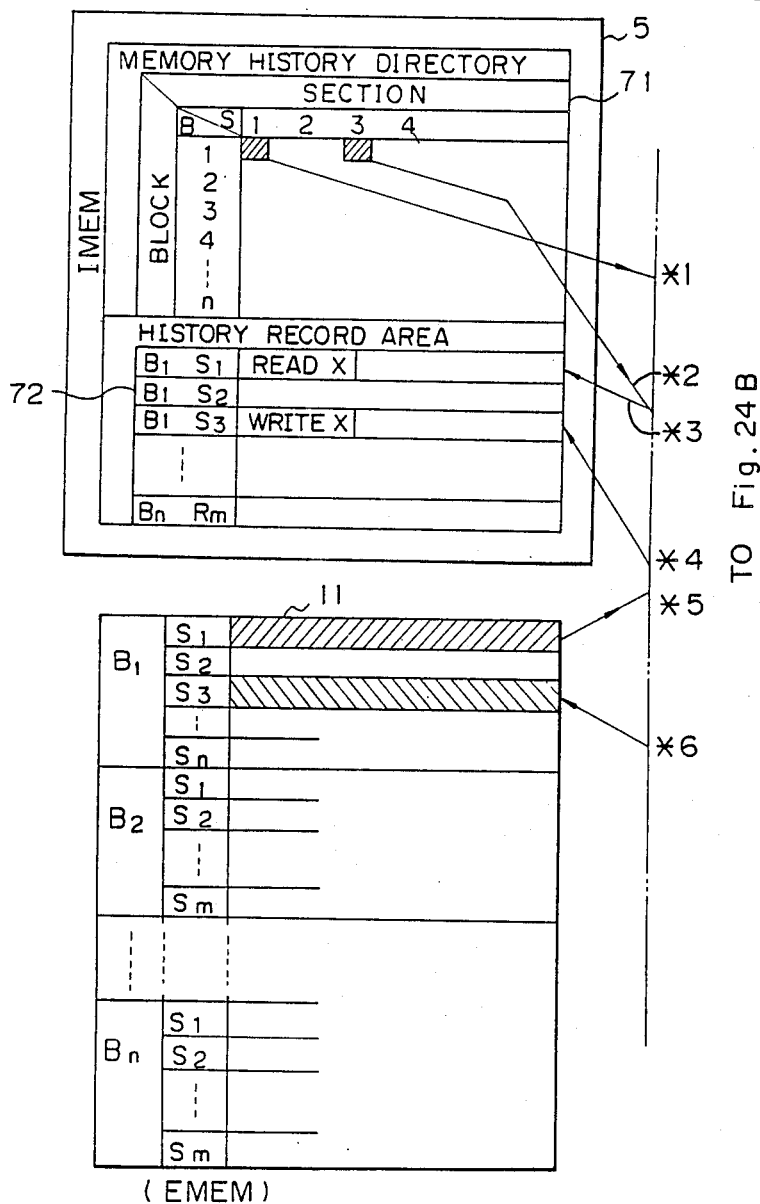

INTEGRATED CIRCUIT CARD

BACKGROUND OF THE INVENTION

1. Field of the Invention

The present invention relates to an integrated circuit card (hereinafter referred to as an IC card).

The convenience of IC cards for multi purpose usage, such as for banking, shopping, and travel services, etc., has encouraged a wide-spread use of these cards, which although having different nomenclatures, for example, Smart Card or Chip-in Card, provide identical facilities.

2. Description of the Related Art

As explained in detail hereinafter, the prior art IC card contains a processor, i.e., a central processing unit (CPU) and a memory, both packaged in a plastic plate as one body. The capacity of the memory is usually, for example, 8K bytes, but such memory capacity is not sufficient when the facilities provided by the IC card are to be expanded. As the large capacity memory, a laser memory card is separately proposed. The laser memory card has a memory which can be written and read by laser light. The capacity of the laser card is several million bytes. In the known art, however, this laser card is physically and logically separated from the IC card.

Namely, the laser memory can be used only when an external terminal machine, i.e., a card acceptance means, is available, and this, of course, is inconvenient when attempting to expand the facilities of the IC card.

Furthermore, as an advanced type of the IC card, IC card having a magnetic stripe thereon is proposed. In the system using such IC card, the information recorded on the magnetic stripe is read and handled by the other processor than that of internal processor of IC card. In such system, the internal processor only reads and handles an information stored in an internal memory of the card.

SUMMARY OF THE INVENTION

Accordingly, an object of the present invention is to provide an IC card having not only an internal memory but also an external memory, in which the CPU in the IC card can provide more facilities than the prior art IC card.

Another object of the present invention is to provide an IC card system being protected from an illegal access to the information in the external memory.

Another object of the present invention is to provide an IC card system in which update history of the information recorded on the external memory can be easily obtained after the verification.

To attain the above object, the IC card is provided with an own processor (CPU) which includes a communication means for controlling an external memory, provided as one body, by the body of the IC card, by an external card acceptance means.

BRIEF DESCRIPTION OF THE DRAWINGS

The above object and features of the present invention will be more apparent from the following description of the preferred embodiments with reference to the accompanying drawings, wherein:

FIGS. 10A and 10B display a general concept of a data processing system including an IC card of the present invention;

FIGS. 11A and 11B are flow charts of a process for each command, performed by a CPU in an IC card of the present invention;

FIGS. 23A and 23B show a specific arrangement of the memory history management part shown in FIG. 22; and FIGS. 24A and 24B are flow chart of read and write operations at an external memory (EMEM), and show an arrangement of related memories.

DESCRIPTION OF THE PREFERRED EMBODIMENTS

Before describing the embodiments of the present invention, the related art and the disadvantages thereof will be described with reference to the related figures.

Figure 1:
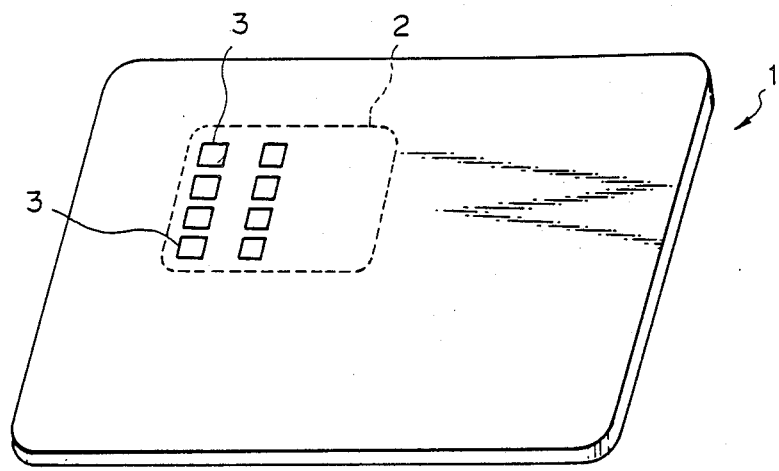
FIG. 1 is a perspective view of a conventional IC card.

FIG. 1 is a perspective view of a conventional IC card. In FIG. 1, reference 1 represents an IC card. The IC card 1 contains an integrated circuit module 2 comprised of a processor (CPU) and an internal memory (neither of which are shown). The CPU and the memory transmit and receive data to and from an external card acceptance means via a plurality of contacts 3. FIG. 1 shows a back surface of the IC card; the front surface thereof has a variety of devices mounted thereon, such as a display unit, a ten key unit, and so on.

Figure 2:
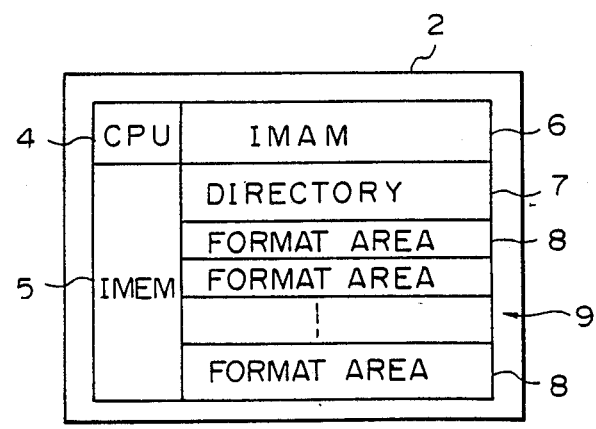
FIG. 2 is a schematic diagram of the internal construction of an integrated circuit module.

FIG. 2 is a schematic diagram of an internal construction of an integrated circuit module. The main components of the integrated circuit module 2 are the processor (CPU) 4 and the internal memory (IMEM) 5. The CPU 4 forms an IC card access means 6 and the memory, generally a main memory, forms a plurality of format areas 8; these format areas 8 also define a file 9.

The internal memory access means (IMAM) 6 sets up an operating system and is able to process an access of the IC card 1 to the external IC card acceptance means. When the access is directed to the file 9 in the memory 5, a search is first made of the directory 7, which is a dictionary storing file numbers (Nos.).

In FIG. 2, the memory (IMEM) is comprised of an IC memory, for example, an electronically erasable programmable read only memory (EEPROM). The capacity of the IC memory is usually, for example, 8K bytes. As previously mentioned, such a memory capacity is not sufficient to develop a high ability general-purpose IC card, and accordingly, in the prior art, the laser memory card is used as an accessory to the IC card. Nevertheless, it is inconvenient to utilize the laser memory card when using the IC card, even though it has a very large memory capacity.

Figure 3:
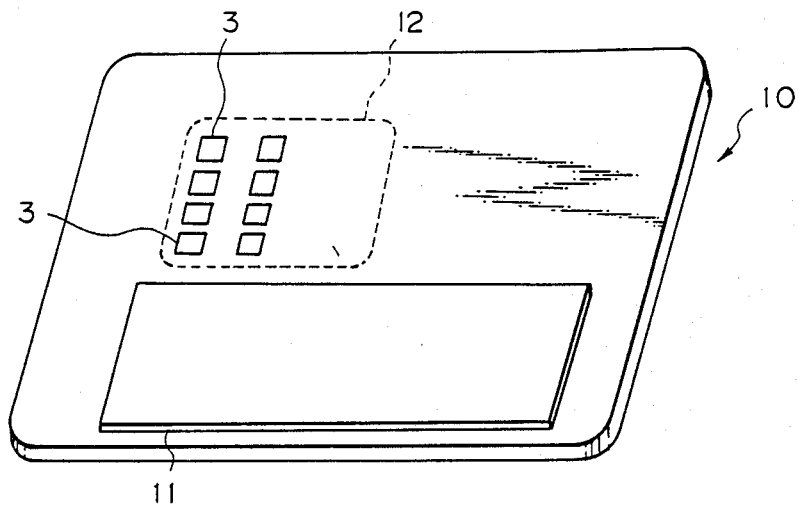
FIG. 3 is a perspective view of an IC card according to the present invention.

FIG. 3 is a perspective view of an IC card according to the present invention. An IC card 10 according to the present invention is featured by an external memory 11 mounted on the surface of the body of the IC card 20 as one body. Namely, the external memory 11 is adhered to the body of the IC card 20. In this case, the external memory 11 is physically and logically separated from the integrated circuit module 12.

Figure 4:
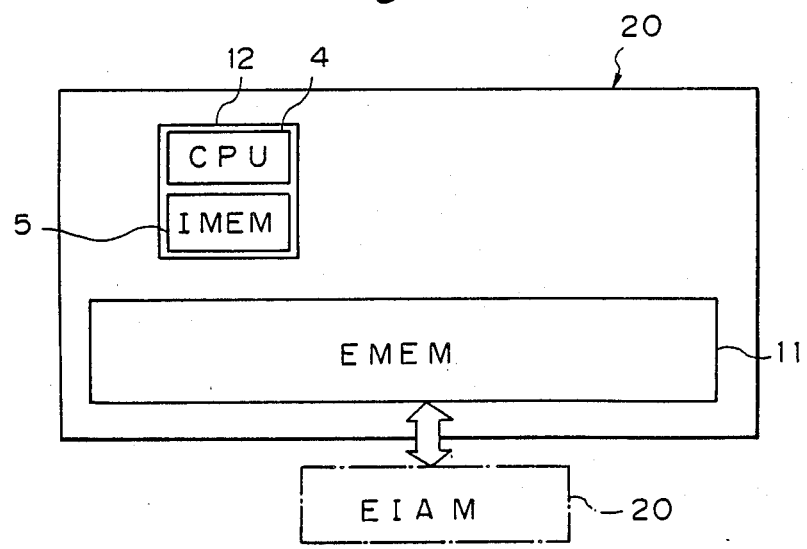
FIG. 4 is a schematic diagram of an arrangement of devices in an IC card according to the present invention.

FIG. 4 is a schematic diagram of an arrangement of devices in an IC card according to the present invention. The IC card 20 contains the processor (CPU) 4 and the internal memory (IMEM) 5, i.e., a main memory, both formed as the integrated circuit module 12, i.e., an IC chip. The contacts (shown by 3 in FIG. 3 but not illustrated in FIG. 4) are used for data communication between the processor 4, together with the internal memory 5, and the external IC card acceptance means. The external memory (EMEM) 11 does not perform this data communication via the contacts 3, but communicates directly with the external IC card acceptance means, as illustrated by a two-way arrow in FIG. 4. Accordingly, only the CPU 4 can manage the external memory 11. Note, members identical to each other are represented by the same reference numerals or characters throughout the drawings.

Figure 5:
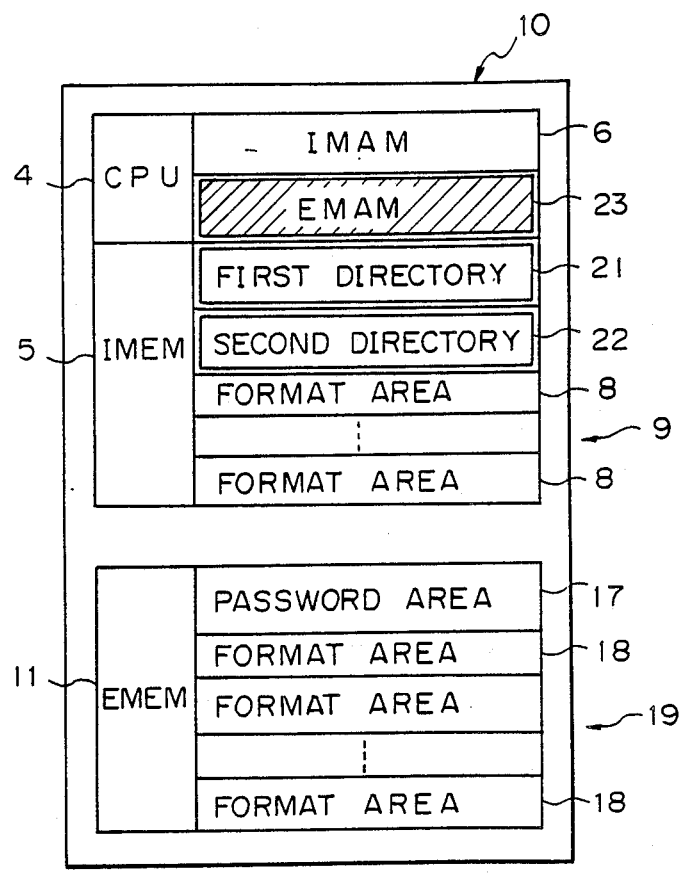
FIG. 5 is a schematic diagram of the general construction of devices mounted on and in an IC card according to the present invention.

FIG. 5 is a schematic diagram of the general construction of devices mounted on and in an IC card according to the present invention. The processor (CPU) 4 is usually provided with a program ROM which creates therein the internal memory access means (IMAM) 6 and the external memory access means (EMAM) 23 of the present invention. Namely, the means (IMAM) 6 and the means (EMAM) 23 are actually established as programs.

The internal memory (IMEM) 5 is preferably a nonvolatile memory, such as an EEPROM, and has a first directory 21 and a second directory 22 formed therein. The second directory 22 defines the format areas 8 of the file 9 allotted for the internal memory per se (main memory), and thus the second directory 22 is substantially the same as the directory 7 shown in FIG. 2. The first directory 21, however, defines the format areas 8 of the file 9 allotted for the external memory 11. The format areas 8 and format areas 17 (explained below) store user data relating to the IC card owner.

The external memory 11 is composed of a password area 17 and the format areas 18 setting up a file 19. The password in the area 17 is used for achieving an authentication check of the external memory 11 by the own processor.

The external memory (EMEM) 11 must have a memory capacity much larger than that of the internal memory (IMEM) 5, and accordingly, the external memory 11 is comprised of an optical memory, such as a laser memory, a CD-ROM and the like, which usually have a memory capacity of several M bytes even though small in size.

Figure 6:
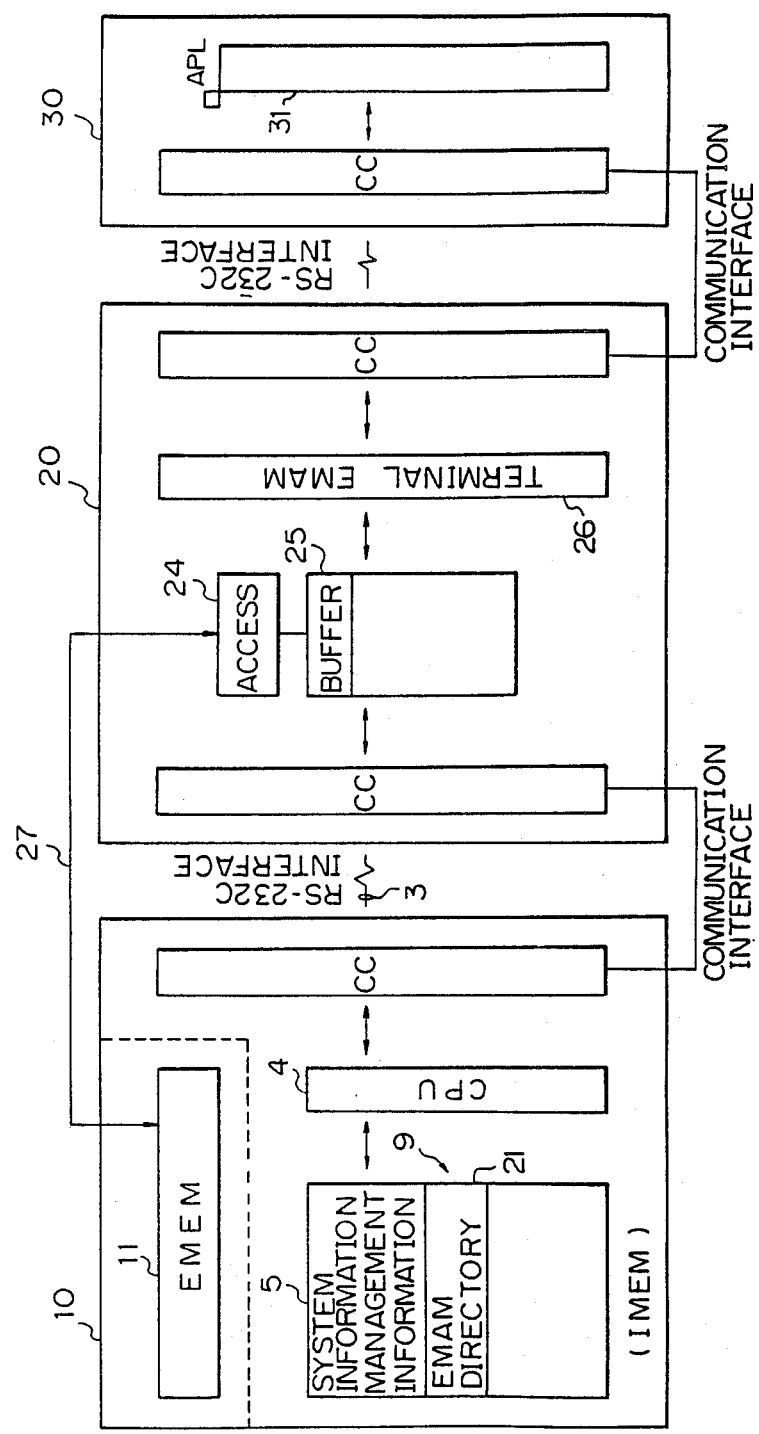
FIG. 6 is a block diagram of an IC card system according to the present invention.

FIG. 6 is a block diagram of an IC card system according to the present invention. In FIG. 6, the characters "CC" denote a usual communication controller, 20 an external IC card acceptance means provided with a usual reader-writer for an actual data communication with the IC card 10, 24 an access unit for the external memory (EMEM) 11 via an interface 27, for example, an optical reading and writing device, 26 a processor containing in particular a terminal EMAM, i.e., an external memory access means, and 30 a terminal station, for example, a personal computer 31 handling an application program (APL).

In FIG. 6, a first logical system constructed by the CPU 4 and the external memory (EMEM) 11 is isolated from a second logical system constructed by the CPU 4 and the internal memory (IMEM) 5, although the first logical system and the second logical system can be logically connected by the external IC card acceptance means 20 via the respective interfaces (27 and 3). Namely, only data handled by the CPU 4 is sent to the external memory (EMEM) 11, and read and write operations for the external memory are carried out by using only addresses handled by the CPU 4. The CPU 4 executes a program related to a device EMAM, and the IC card acceptance means (EIAM) 20, e.g., the reader-writer and reading and writing device, communicates with the CPU 4 and the EMEM 11. In the EIAM 20, the processor (CPU) 26 executes a program related to a terminal EMAM. The CPU (terminal EMAM) 26 is supplied with a command by the aforesaid application program (APL), and in accordance with the kind of command, the CPU 26 selectively executes an internal processing of the terminal EMAM, an access to the external memory 11, and an access to the CPU 4 (device EMAM), and according to the result of this internal processing and the result of the access, a response for the application is returned to a personal computer 31 (application program). The CPU 4 (device EMAM), after discrimination by the terminal EMAM 26 of a command from the application program, is called by the terminal EMAM 26, if required by the resultant discrimination, and the CPU 4 then executes a command given from the terminal EMAM. The result of this command execution is returned to the terminal EMAM.

When using the IC card 10, security must be taken into consideration, particular the security of data stored in the external memory (EMEM) 11. This is because, the contents of the EMEM 11 can be easily stolen by a third party, since the EMEM 11 is exposed outside the body of the IC card 10.

Figure 7:
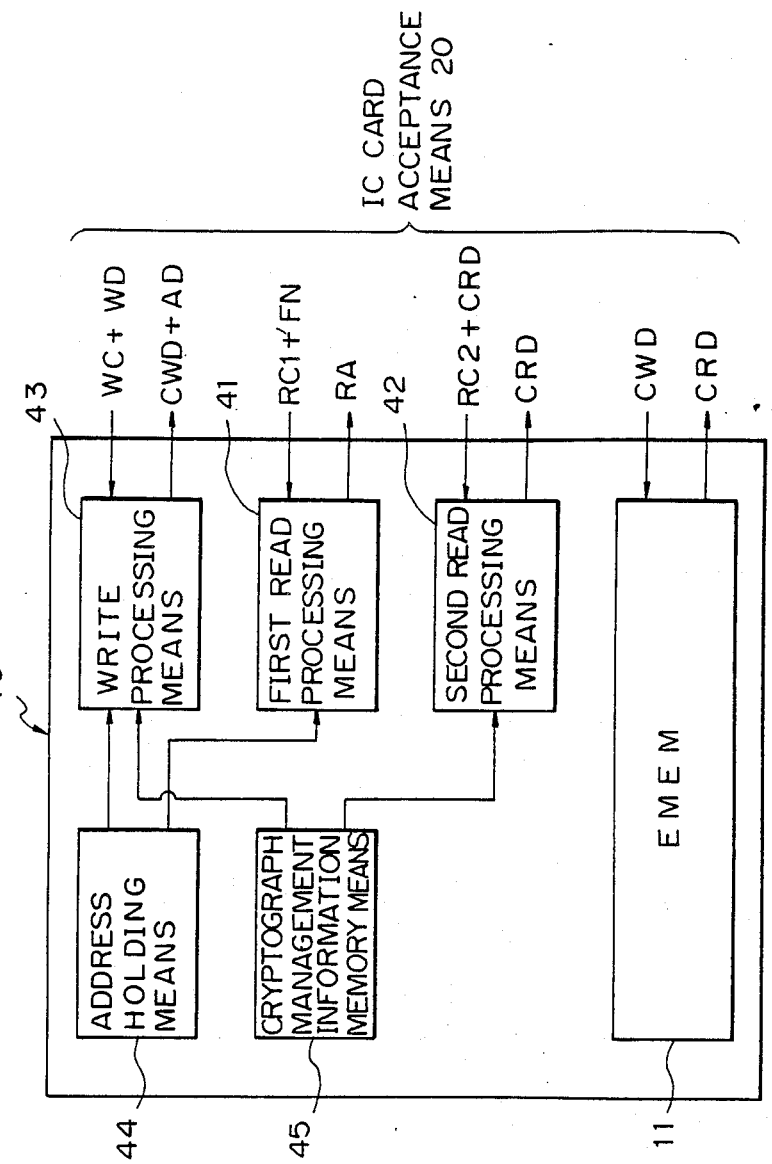
FIG. 7 is a block diagram showing the principle construction of an IC card according to the present invention.

FIG. 7 is a block diagram showing the principle construction of an IC card according to the present invention. The IC card of FIG. 7 is designed while taking security into consideration. In FIG. 7, the IC card 10 having a security function is comprised of the aforesaid external memory (EMEM) 11, an address holding means 44 for holding addresses of the files 19 stored in the EMEM 11, a cryptograph management information memory means 45 for storing the cryptographic management information used for enciphering data and for deciphering the ciphered data, a write processing means 43, a first read processing means 41 and a second read processing means 42. The means 41, 42 and 43 are functions of the CPU 4, and the means 44 and 45 are realized by the internal memory (IMEM) 5, e.g., a main memory.

The write processing means 43 is able to start operating upon receipt of a write command WC and the corresponding write data WD, encipher the thus given write data WD with reference to the cryptograph management information, search the corresponding address AD of the external memory (EMEM) 11 at which the thus enciphered write data CWD is to be written by referring to the address holding means 44, and to return the enciphered write data CWD and the corresponding address AD, as a response.

The first read processing means 41 is able to start operating upon receipt of a first read command RC1 and the corresponding file number FN of the file 19, to search the corresponding read address RA specified by the given file number with reference to the address holding means 44, and to return the read address RA as a response.

The second read processing means 42 is able to start operating upon receipt of a second read command RC2 and a ciphered read data CRD, to decipher the thus given enciphered read data CRD by referring to the cryptographic management information, and to return the thus deciphered read data DRD as a response.

The address holding means 44 is realized by the internal memory, and the address holding means specifies a new area in the file 9 with reference to a vacant area in the first directory 21.

Note, the means 45 (FIG. 7) has various keys and a ciphering algorithm, commonly known as a "DES" (Data Encryption System proposed by IBM).

Figure 8:
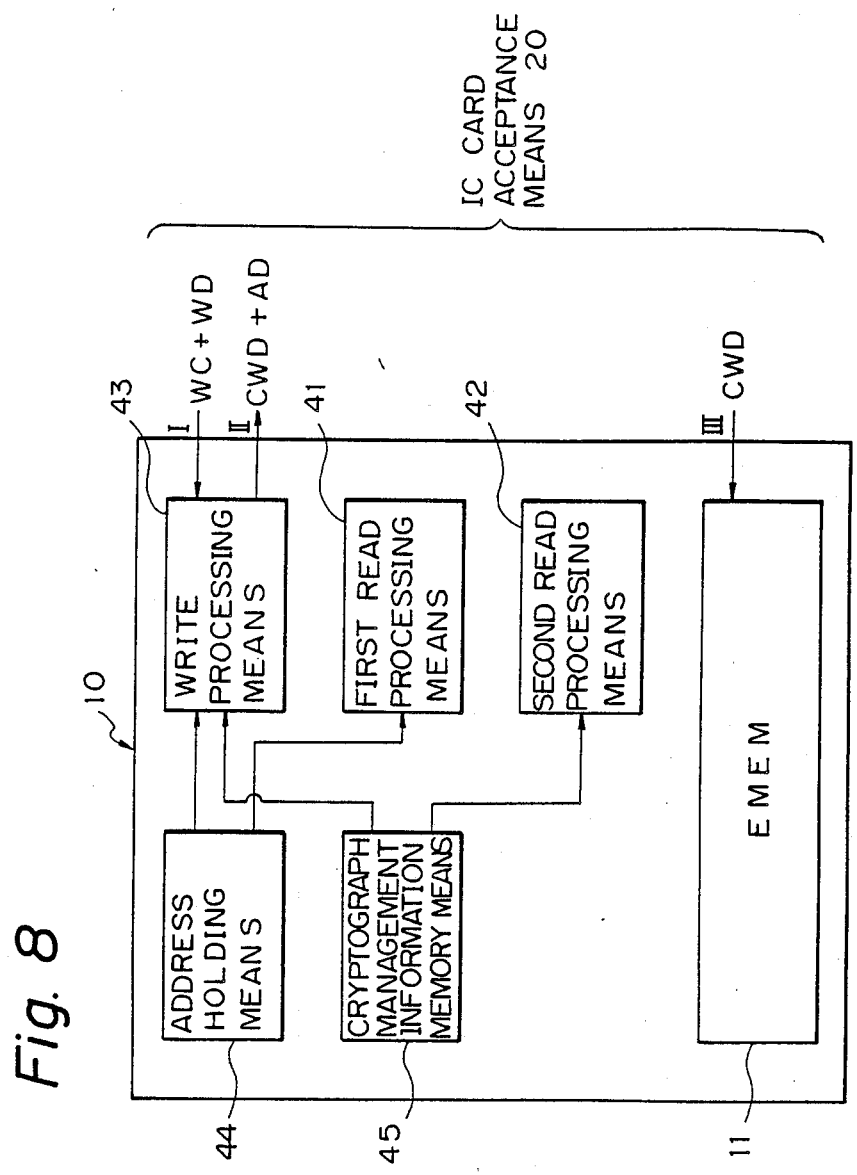
FIG. 8 is a block diagram for clarifying a write process performed in the IC card shown in FIG. 7.

FIG. 8 is a block diagram for clarifying a write process performed in an IC card of FIG. 7. For example, when writing data in the external memory (EMEM) 11, the following process is carried out:

(I) the given write command WC and the corresponding write data WD are input to the IC card 10, (II) the enciphered write data CWD and the corresponding address AD for writing in the external memory (EMEM) 11 are obtained and output from the IC card 10, and (III) the thus enciphered write data CWD is written in the EMEM 11.

Figure 9:
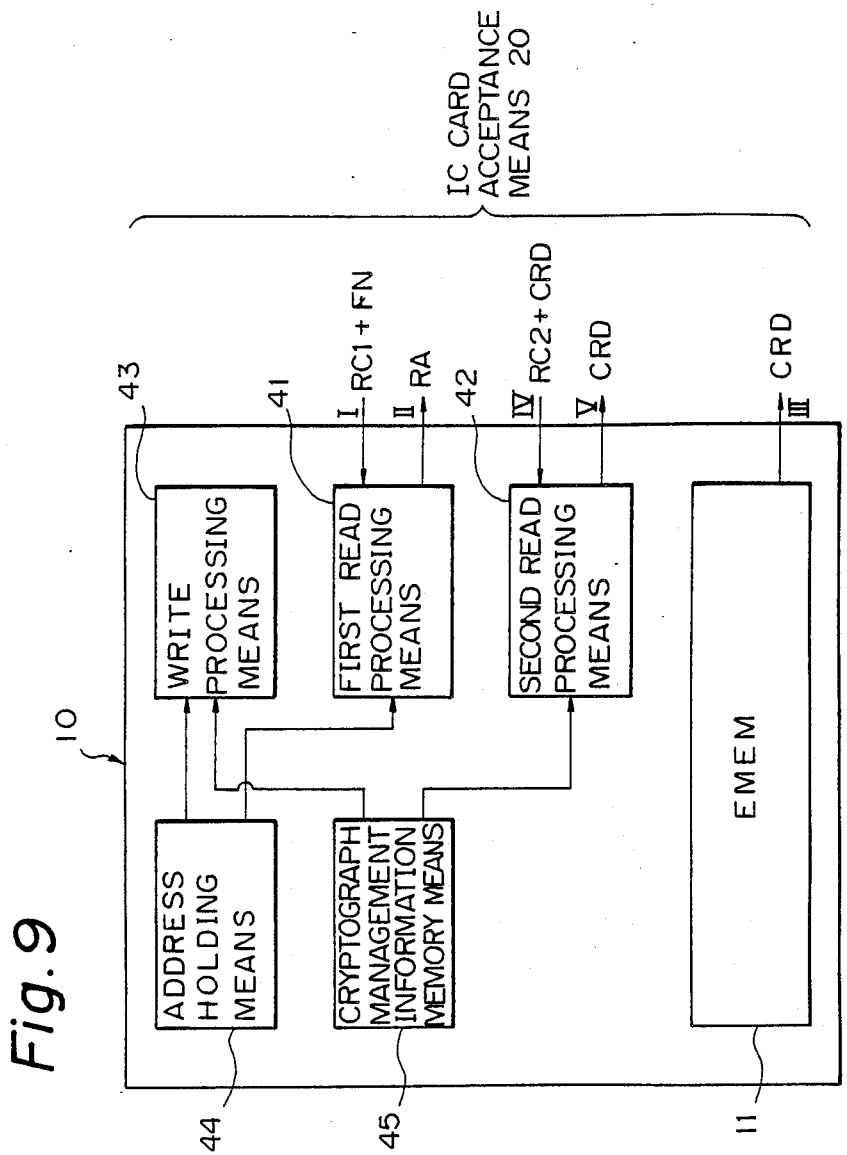
FIG. 9 is a block diagram for clarifying a read process performed in the IC card shown in FIG. 7.

FIG. 9 is a block diagram for clarifying a read process performed in an IC card of FIG. 7. For example, when reading data from the external memory (EMEM) 11, the following process is carried out:

(I) the given first read command RC1 and the corresponding file number FN are input in the IC card 10, (II) the corresponding read address AD for the external memory 11 is searched by the address holding means 44 and output from the IC card 10, (III) the enciphered read data CRD is obtained, by using the searched read address AD, from the external memory 11, (IV) the enciphered read data CRD from the external memory 11 is given to the IC card 10 together with a second read command RC2, and (V) a deciphered read data DRD is output from the IC card, in response to the second read command RC2.

Figure 10A:
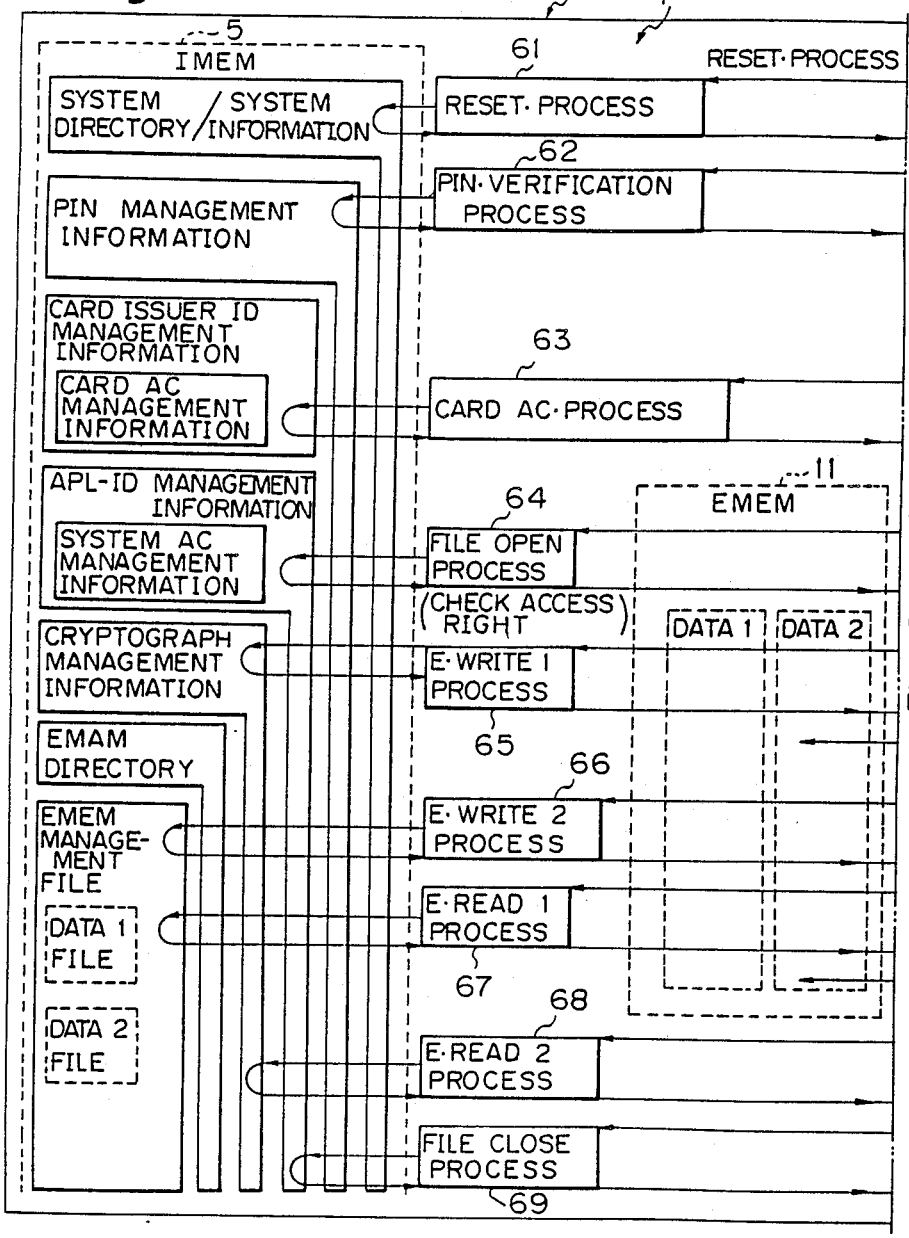

FIGS. 10A and 10B display a general concept of a data processing system including an IC card of the present invention. FIG. 10A displays the side of the IC card 10 and FIG. 10B displays the side of the external IC card acceptance means 20 together with the terminal station 30, e.g., a personal computer. In FIG. 10A, reference numeral 61 denotes a reset processing means, 62 a personal identification number (PIN) verification processing means, 63 a card authentication (AC) processing means, 64 a file open processing means, 65 an E (abbreviation of EMEM 11) write 1 processing means, 66 an E write 2 processing means, 67 an E read 1 processing means, 68 an E read 2 processing means, and 69 a file close processing means. Note, in FIG. 10B, C and R represent a command block and a response block, respectively.

The internal memory, e.g., a main memory (IMEM), 5 holds system directory/system information, PIN management information, card issuer identification (ID) management information, card AC management information, APL-ID management information, system AC management information, cryptograph management information, i.e., keys for drafting a cryptograph or deciphering the cryptograph, an EMAM (external memory access means) directory, external memory (EMEM) management files, and so on. The personal identification number (PIN) is a secret code for confirming whether or not the user of the IC card is an entitled user. The PIN is registered in the IC card and, when the IC card is used, the PIN is checked for verification with the secret code input by a user. The IC card is not activated until the PIN verification is satisfied, whereby the IC card is able to access the system (20, 30). A variety of PIN's exist, such as a card manufacturer PIN, a transport PIN, card issuer PIN, an own PIN, and so on. The card issuer ID management information is, for example, a name of a bank, a bank code, a card issuing date, a card issuance number, and so on. The authentication code (AC) is composed of data or an algorithm, in terms of elements (user, card, terminal machine or terminal station, service provider and the like) comprising an IC card system, used for confirming an authentication between any two elements. This data or algorithm is predetermined between two elements, and thereafter, must be kept secret from other parties. Use of the AC enables a prevention of non-authorized use or forgery of an IC card and tampering with data in the IC card, and the detection of unauthorized use, forgery, and tampering with data. The APL-ID is a key essential to a business file when accessed by a business application program. Namely, a business application is made possible by specifying the APL-ID, to allow access to a required business file without referring to a physical address, and so on. The cryptograph management information produces a cryptograph for deciphering the ciphered data stored in the external memory (EMEM) 11 and a management information of a radix number required when a new data is to be stored therein, and as materials similar thereto, a file correspondence number of the files in the EMEM 11, a cryptograph for deciphering, data which has been cryptographically processed, and so on. The EMAM (external memory access means) directory is composed of a directory for the EMEM 11 and a directory for the internal memory (IMEM) 5. The directory for the EMEM 11 manages file names for managing the EMEM 11, and file correspondence numbers for managing the same. The directory for the IMEM 5 manages a file correspondence number in the external memory (EMEM) 11 and addresses in a memory, managing attribute information with regard to the files in the EMEM 11. The EMEM management serves as an area for managing, in the file units, the attribute information for data in each file of the EMEM 11, which attribute information is managed by the directory for the IMEM. In the data area of the files in the external memory (EMEM) 11, attribute information is recorded which relates to the data in each file of the EMEM 11. Further similar contents to be managed exist, such as the date of drafting of the related files, renewal date, and start and end of each physical address corresponding to the external memory (EMEM) 11.

The EMAM (external memory access means) 23 is provided with the above mentioned processing means 61 through 69 and others. The reset processing means 61 (FIG. 10A) starts operating upon receipt of a RESET command from the side 20, 30 (FIG. 10B) and resets the system directory and the system information in the internal memory (IMEM) 5 (FIG. 10A), and then sends a RESET response to the side 20, 30. The PIN verification processing means 62 (FIG. 10A) starts operating upon receipt of a PIN verification command accompanied by PIN data and carries out a verification process of the PIN data with reference to the PIN management information (FIG. 10A), and then sends a verification result to the side 20, 30. The card AC processing means 63 (FIG. 10A) starts operating upon receipt of a card AC command and performs a check on the card authentication with reference to the card AC management information in the internal memory (IMEM) 5 (FIG. 10A), and then returns the card AC data to the side 20, 30. The file open processing means 64 starts operating upon receipt of a file open command and carries out a check of an access right with reference to the system AC management information in the IMEM 5 (FIG. 10A), and then sends the result of the related file open to the side 20, 30. The E write 1 processing means 65 starts operating upon receipt of an E write 1 command and the corresponding data, enciphers the thus given data, and returns the enciphered data and a write position. The above write position is a write position in the external memory (EMEM) 11, and is obtained by reference to the content of the EMEM management file in the IMEM 5 (FIG. 10A). The E write 2 processing means 66 starts operating upon receipt of an E write 2 command and resultant information (the result of a write operation to the EMEM 11), and writes the result of the write operation to the EMEM 11 for the EMEM management file in the IMEM 5 (FIG. 10A), and then sends the result of the related process to the side 20, 30. The E read 1 processing means 67 starts operating upon receipt of the E read 1 command and a file name, and searches for a position on the external memory (EMEM) 11 in which the related file is stored, with reference to the EMEM management file, and then sends the result and the position to the side 20, 30 (FIG. 10B). The EMAM read 2 processing means 68 starts operating upon receipt of an E read 2 command and enciphered data and carries out a deciphering operation with reference to the cryptograph management information in the IMEM 5 (FIG. 10A), and then sends the result and the deciphered data to the side 20, 30 (FIG. 10B). The file close processing means 69 starts operating upon receipt of a file close command and carries out a file close operation, and then sends the result to the side 20, 30 (FIG. 10B).

In the terminal side 20 and 30 (FIG. 10B), when the IC card 10 is inserted in the reader-writer, together with the reading and writing device, the terminal, i.e., the external IC card acceptance means 20, sends a RESET command to the IC card 10. Where data is to be written in the external memory (EMEM) 11, the means 20 issues a PIN verification request, a card AC request, a file open request, and a E write 1 request, and thereafter, the related write operation to the EMEM 11 is performed and the E write 2 request is issued. Where data in the EMEM 11 is to be read, the means 20 issues an E read 1 request, and thereafter, the related read operation to the EMEM 11 is carried out. Then an E read 2 request is issued, and when the access to the EMEM 11 is completed, a file close request is issued.

When a PIN verification request is issued, a PIN command is sent to the processor (CPU) 4 forming the processing means 61 through 69; when a card AC request is issued, a card AC command is sent to the CPU 4 in the IC card 10; when a file open request is issued, a file open command is sent to the CPU 4 in the IC card 10; when an E write 1 request is issued, an E write 1 command is sent to the CPU 4 in the IC card 10; when an E write 2 request is issued, an E write 2 command is sent to the CPU 4 in the IC card 10; when an E read 1 request is issued, an E read 1 command is sent to the CPU 4 in the IC card 10; and when an E read 2 request is issued, an E read 2 command is sent to the CPU 4 in the IC card 10.

Figure 11B:
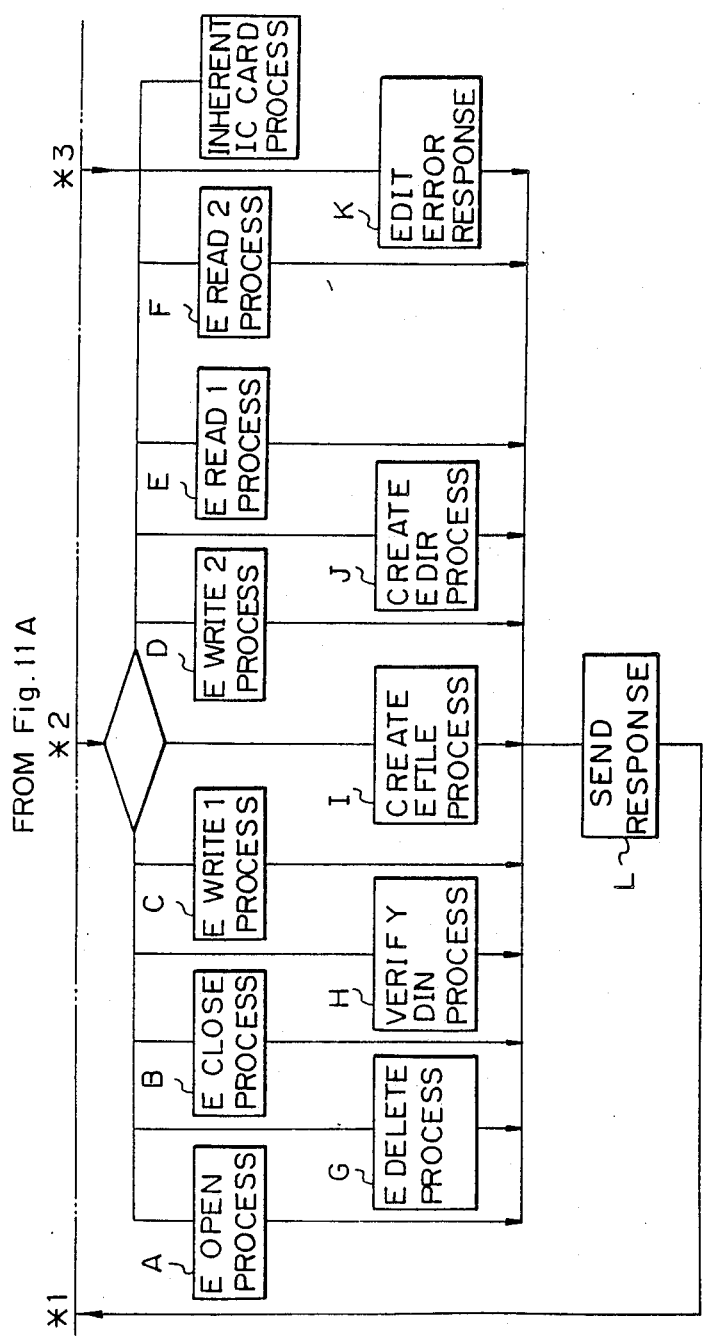

FIGS. 11A and 11B are flow charts of a process for each command, performed by a CPU in an IC card of the present invention. An initial process is started ("a") by a power-ON, and when a command is received ("b") from a PIN PAD (FIG. 10B), a command check is carried out ("c"). If the command code is correct (YES in step "d"), a command parameter check is carried out ("e"). The command parameter check determines whether or not the attribute information conforms with the prescribed parameter. If the result at step "d" is NO, an error response is edited in step "K" in FIG. 11B, and an error response is sent to the means 20 ("L" in FIG. 11B). If the result of the command parameter check is correct (YES in step "f"), a command sequence check is started ("g"). If the result at step "f" is NO, the error response edit is carried out. If the result of the command sequence check is YES ("h"), a command distribution is started ("i"). The command sequence check is introduced to find contradictions in the command sequence; for example, if a file write command precedes a file open command, this is a contradiction. If the result of the command c sequence check is NO in step "h", the flow goes to step "K" (FIG. 11B). When one of the various processes is finished, a response is sent to the means 20 ("L" in FIG. 11B). The above mentioned processes are performed in steps "A" through "J" in FIG. 11B. Note, for brevity, in some of these steps the reference character "E" represents the "EMEM", i.e., the external memory 11 (FIG. 5 and others). Details of these processes will be presented below.

Figure 12:
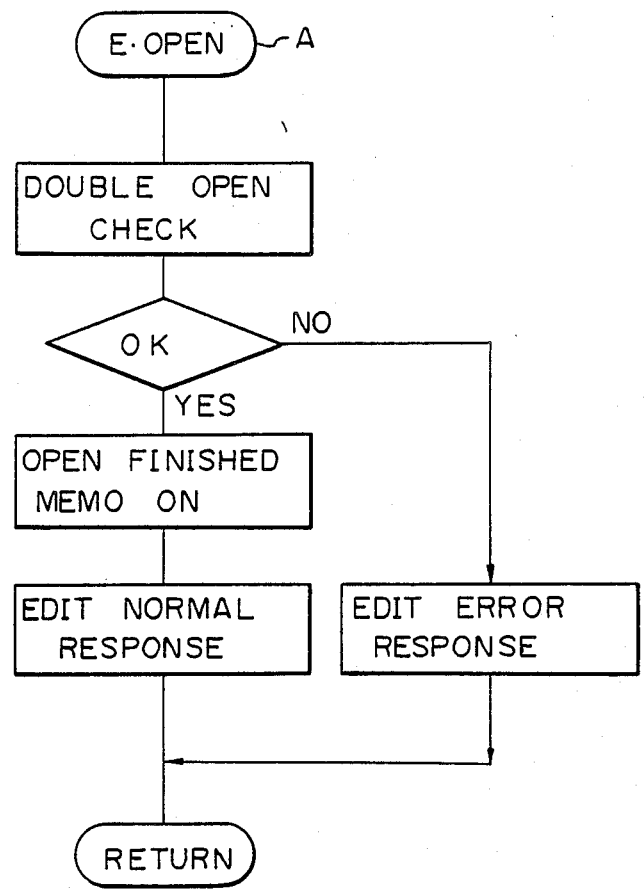
FIG. 12 is a detailed flow chart of the process "A" shown in FIG. 11B.

FIG. 12 is a detailed flow chart of the process "A" shown in FIG. 11B. In the E OPEN process "A", a double open check is carried out to avoid a double occupation of the same file. If the result is YES, an open finished memo (flag) is made ON (hoist), and a normal response is edited. In the result is NO, an error response is edited.

Figure 13:
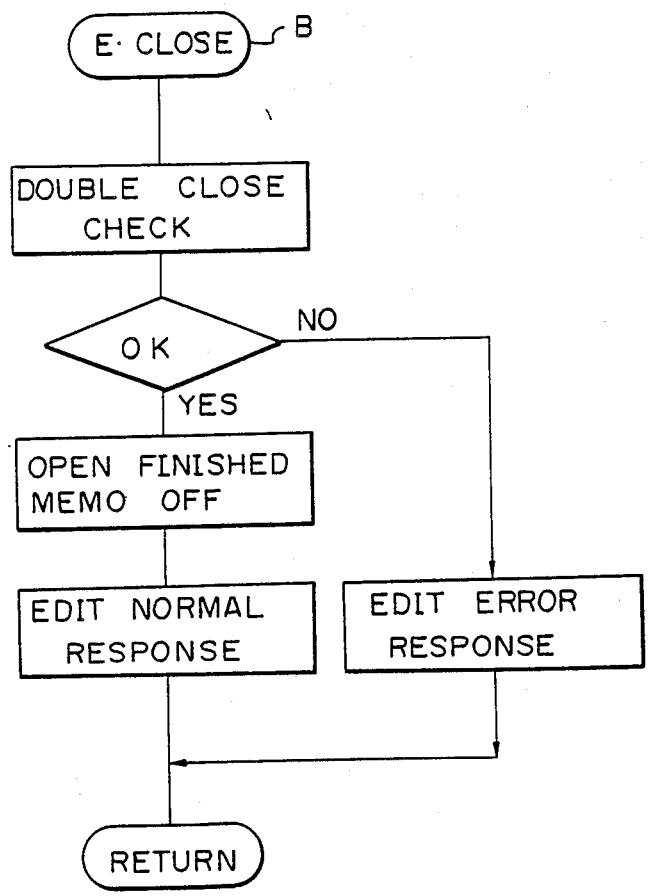
FIG. 13 is a detailed flow chart of the process "B" shown in FIG. 11B.

FIG. 13 is a detailed flow chart of the process "B" shown in FIG. 11B. In the E CLOSE process "B", a double close check is carried out for a similar reason as for the double open check, and if the result is YES or NO, a normal or an error response is edited accordingly.

Figure 14:
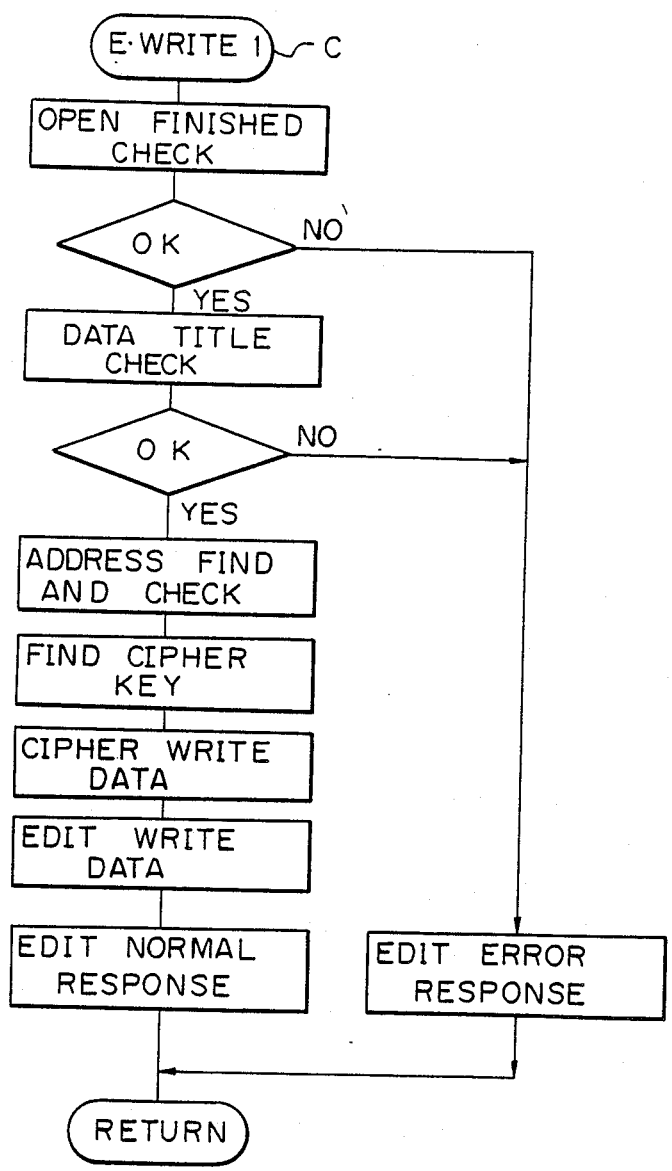
FIG. 14 is a detailed flow chart of the process "C" shown in FIG. 11B.

FIG. 14 is a detailed flow chart of the process "C" shown in FIG. 11B. In the E WRITE 1 process "C", it is determined whether or not the related data is open. If the result is YES, a data title check is carried out to determine whether or not the related data has a right to access the file. If the result is YES, the corresponding address is found and edited. Further, the corresponding key is found, and using the key, the write data is enciphered, and then edited. Finally, the related edition of the response is performed. If the result of the step (OPEN FINISHED CHECK) is NO, the related edition of the response is performed. This also applies when the result of the data title check is NO.

Figure 15:
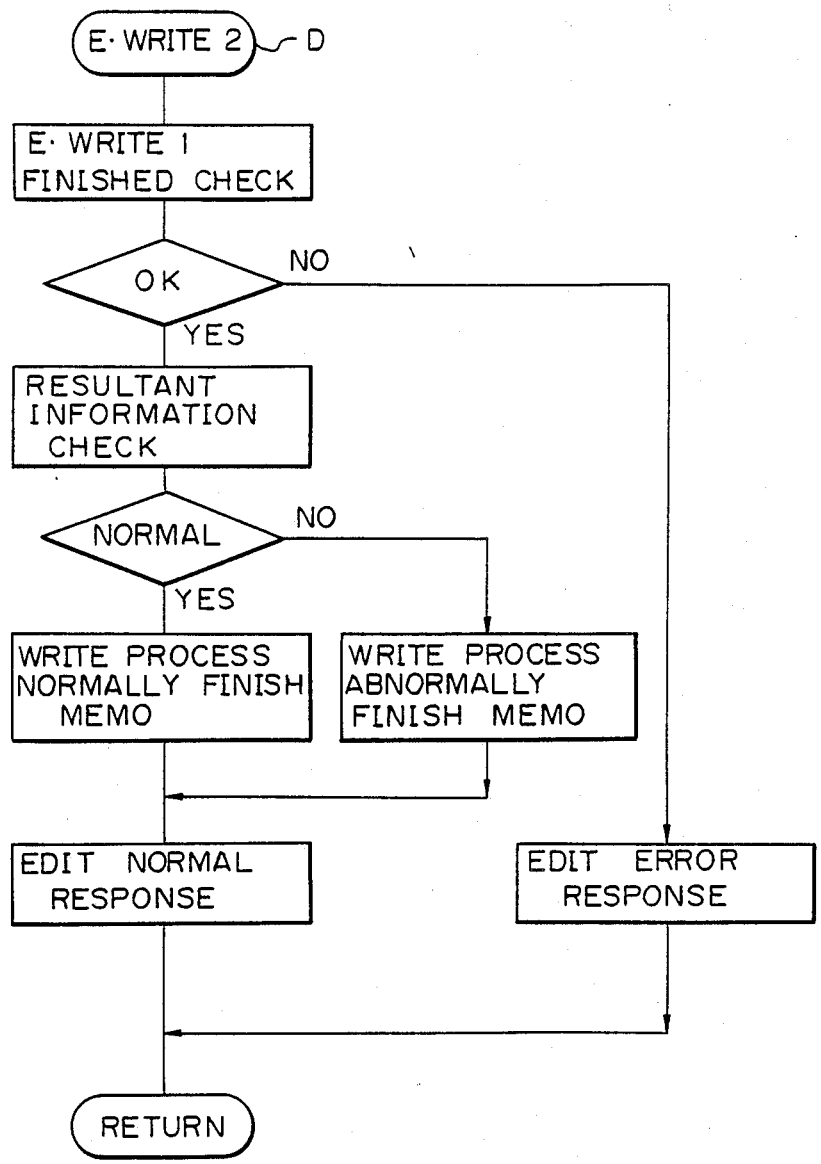
FIG. 15 is a detailed flow chart of the process "D" shown in FIG. 11B.

FIG. 15 is a detailed flow chart of the process "D" shown in FIG. 11B. In the E WRITE 2 process, an E write finished check is carried out. Namely, it is determined whether or not the preceding E write 1 process was completed without error. If the result is YES, the resultant information is checked. The resultant information indicates, for example, whether or not an overwrite has occurred in the external memory (EMEM). If the result of the check is NO, the error response is edited. If the check of the resultant information indicates a normal result, then a normal completion of the write process is recorded (memo). If the check indicates an abnormal result, then an abnormal completion of the write process is recorded (memo). The normal response is then edited, wherein the term "normal" means that the flow per se was completed normally and is not concerned with the above mentioned abnormal completion of the write process.

Figure 16:
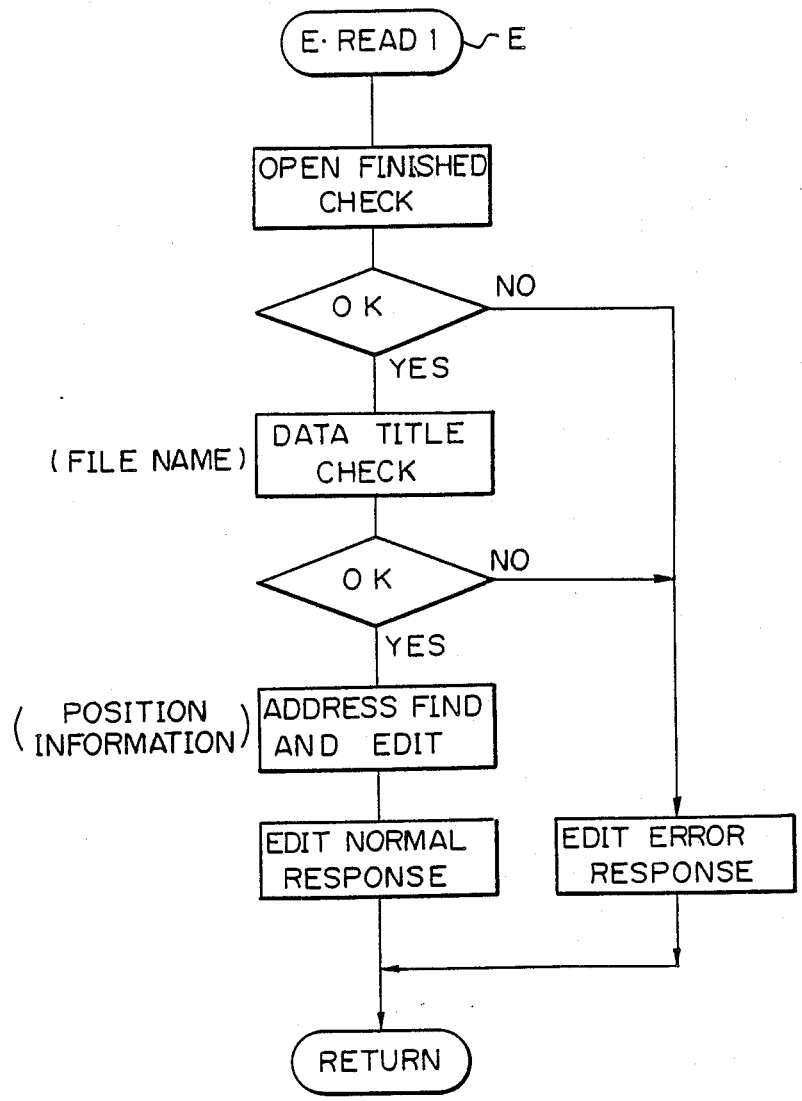
FIG. 16 is a detailed flow chart of the process "E" shown in FIG. 11B.

FIG. 16 is a detailed flow chart of the process "E" shown in FIG. 11B. In the E READ 1 process, the open finish check is carried out as in the flow of FIG. 14. If the result of the check is YES, a data title check is started, as in the flow of FIG. 14. If the result of the check is YES, the corresponding address is found by the address holding means (shown by 44 in FIG. 7), as in the flow of FIG. 14, and then edited. The remaining steps are similar to those explained before.

Figure 17:
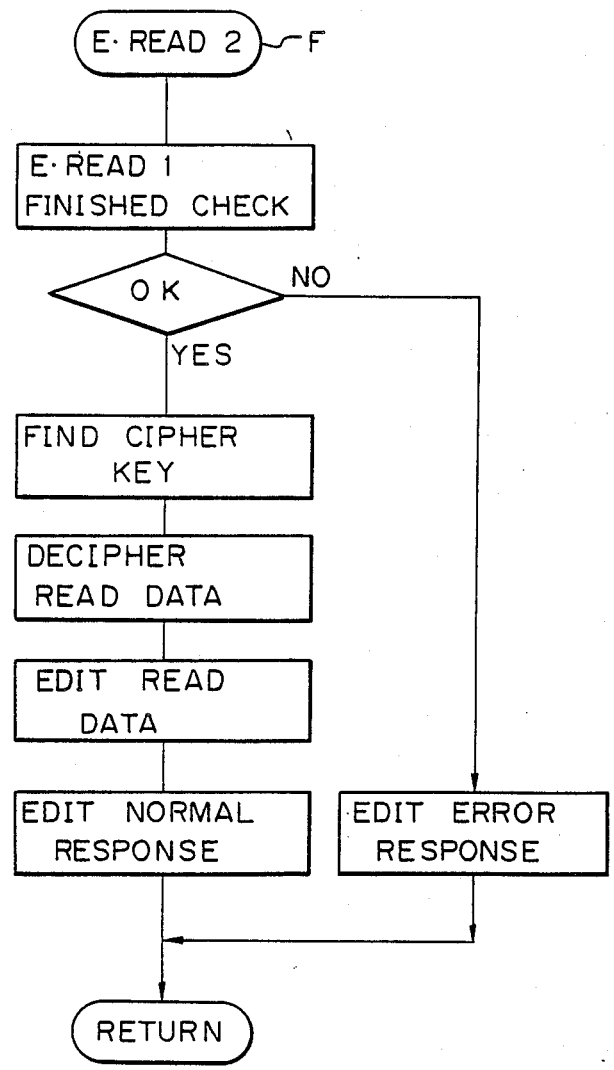
FIG. 17 is a detailed flow chart of the process "F" shown in FIG. 11B.

FIG. 17 is a detailed flow chart of the process "F" shown in FIG. 11B. In the E READ 2 process, the E read 1 finished check is carried out in the same as the corresponding step in FIG. 15. If the result is YES, the corresponding cipher key is found, and using the key, the read data is deciphered to edit the read data. The remaining steps are similar to those explained before.

Figure 18:
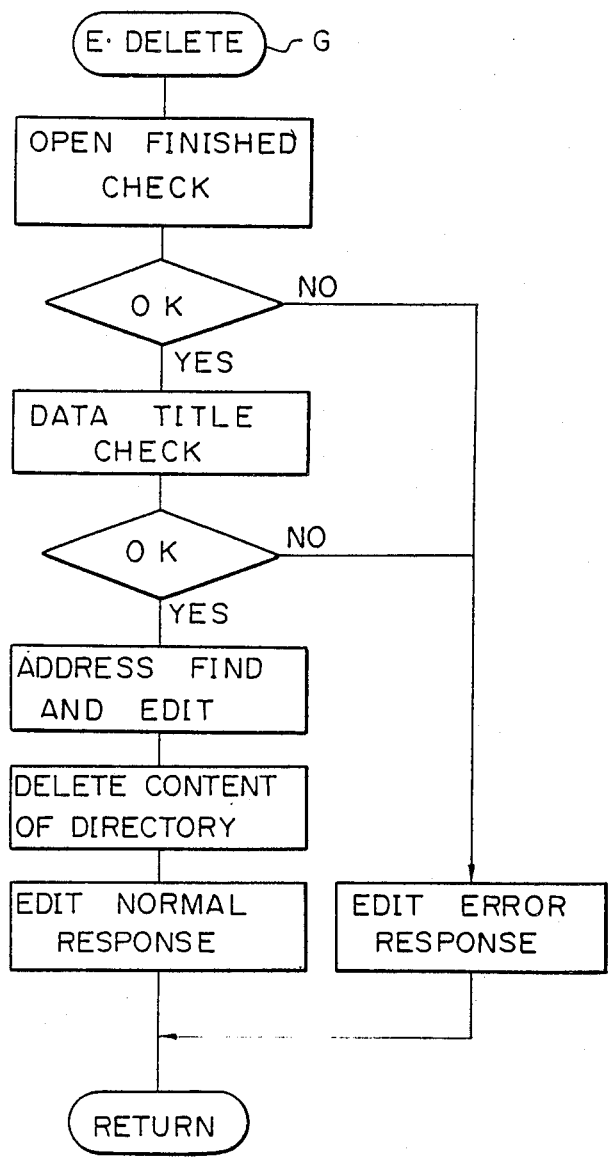
FIG. 18 is a detailed flow chart of the process "G" shown in FIG. 11B.

FIG. 18 is a detailed flow chart of the process "G" shown in FIG. 11B. In the E DELETE process, an open finished check is carried out, and if the result of the check is YES, a data title check is carried out. Namely, if the result of this check is YES, the corresponding address is found and edited to delete the content of the directory (shown by 21 in FIG. 5). The remaining steps are similar to those explained before.

Figure 19:
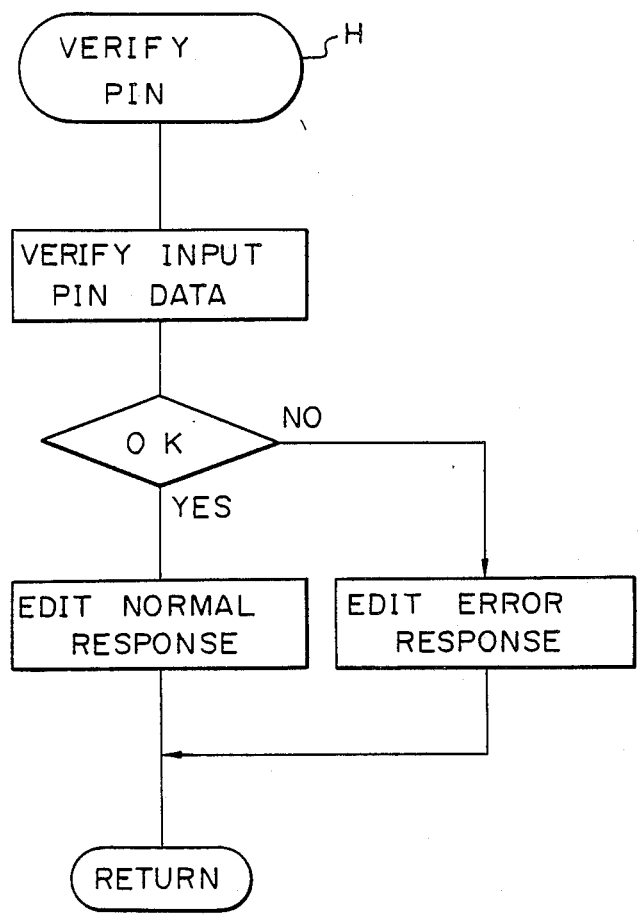
FIG. 19 is a detailed flow chart of the process "H" shown in FIG. 11B.

FIG. 19 is a detailed flow chart of the process "H" shown in FIG. 11B. In the VERIFY PIN process, an authentication check for an input PIN data is carried out. The remaining steps are similar to those explained before.

Figure 20:
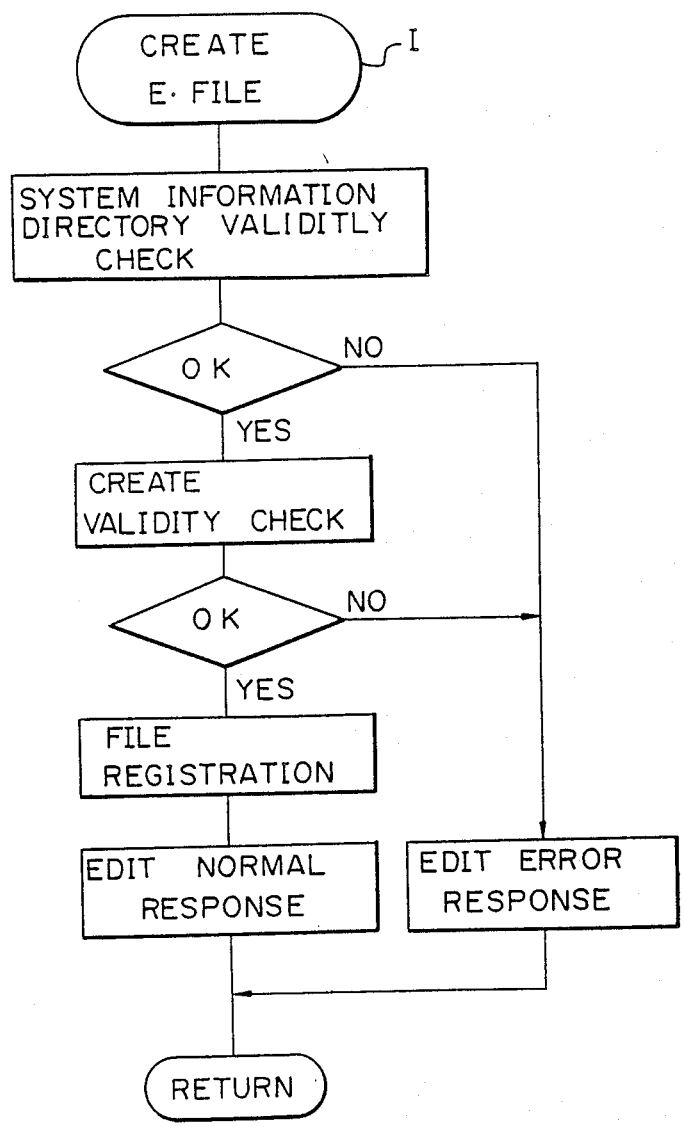
FIG. 20 is a detailed flow chart of the process "I" shown in FIG. 11B.

FIG. 20 is a detailed flow chart of the process "I" shown in FIG. 11B. In the CREATE E FILE process, a validity check for the system information directory is carried out, and if the result of the check is YES, then a validity of the CREATE is checked. Namely, if the result of this check is YES, a file registration is carried out. The remaining steps are the same as described previously. The validity of the CREATE is checked to confirm whether the file is created as required. If the result of the validity check is YES, the registration of the file to be created is carried out. The remaining steps are similar to those explained before.

Figure 21:
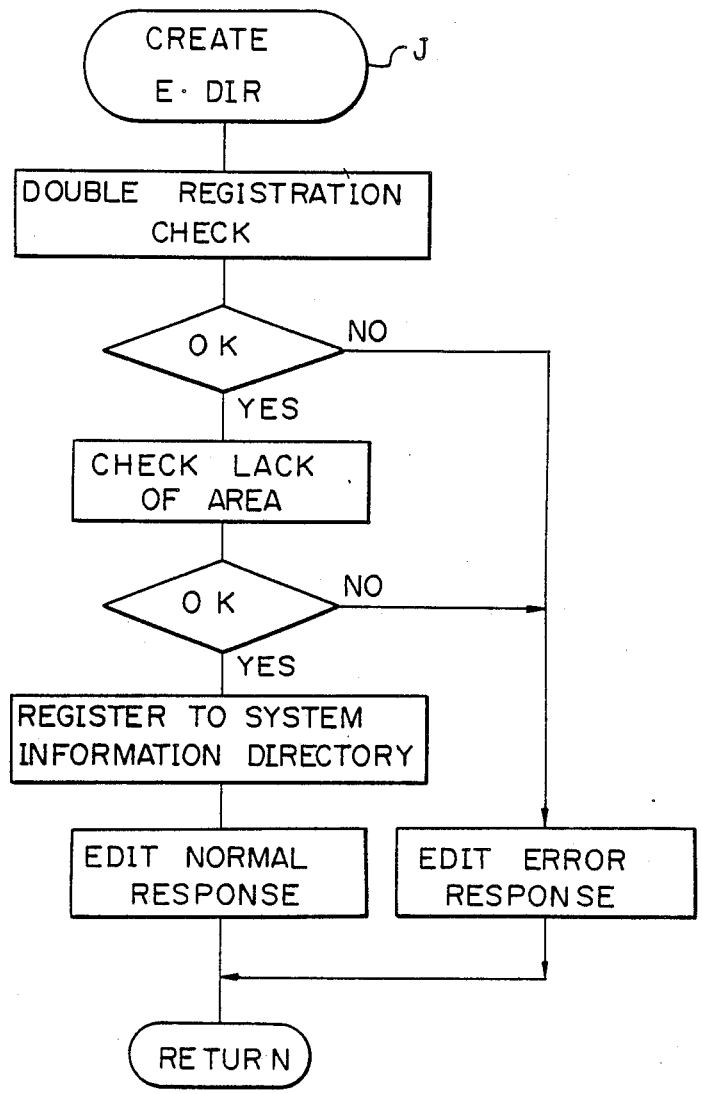
FIG. 21 is a detailed flow chart of the process "J" shown in FIG. 11B.

FIG. 21 is a detailed flow chart of the process "J" shown in FIG. 11B. In the CREATE E DIR process, the directory for the newly introduced file is created. Namely, first double registration is checked to avoid a registration conflict. If the result of the check is YES, then it is determined whether or not a sufficient directory area exists. If the result of the check is YES, a registration to the directory is carried out. The remaining steps are similar to those explained before.

As understood from the above description, the IC card 10 is provided, as one body with the external memory (EMEM) 11, which has a very large memory capacity, and therefore, it is possible to store a vast amount of information, for example, video information. Specifically, it is possible to record, for example, a photograph of the user's face, user's voice, user's signature, user's fingerprints, and so on. Of course, it is also possible to store information which overflows the internal memory (IMEM) 5 having a small memory capacity. In this case, the date must be recorded simultaneously, since such information, for example, a photograph of the user's face, will not represent the user's face after an elapse of time. Accordingly, the date of the record is also important for, for example, a driving license, a passport, and the like.

According to an embodiment of the present invention, a memory history management area is further created. The memory history management area manages information to be stored in the external memory (EMEM) 11, such as a photograph of the user's face and so on, as mentioned above.

Figure 22:
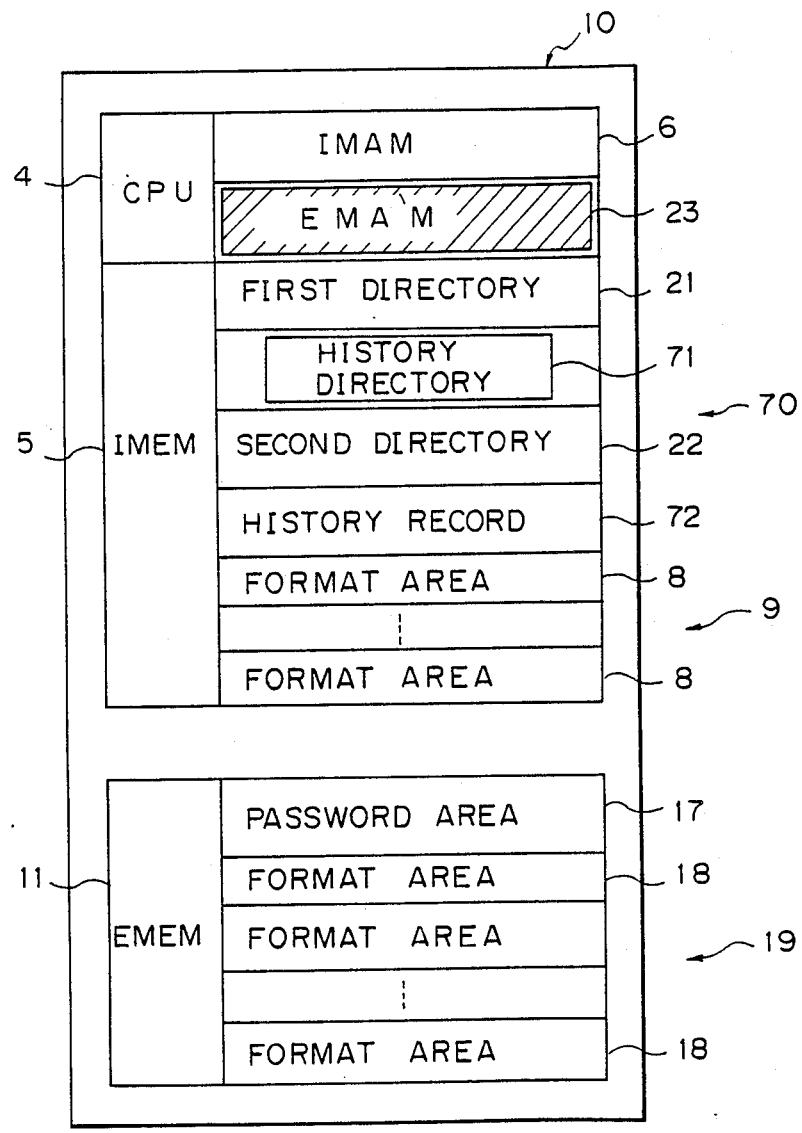
FIG. 22 is a schematic diagram of the general construction of devices mounted in and on an IC card, particularly a memory history management part, according to the present invention.

FIG. 22 is a schematic diagram of the general construction of devices mounted in and on an IC card, in particular a memory history management part according to the present invention. As is clear, the arrangement of FIG. 22 is a modification of the arrangement shown in FIG. 5, explained previously. The history management part 70 is composed of at least a memory history directory 71 formed in the first directory 21 (FIG. 5). The memory history directory 71 preferably cooperates with a history record area 72 formed in the second files, i.e., the file 9 (FIG. 5). The history directory 71 and the record area 72 are controlled by the processor (CPU) 4, in particular the external memory access means (EMAM) 23.

Figure 23B:
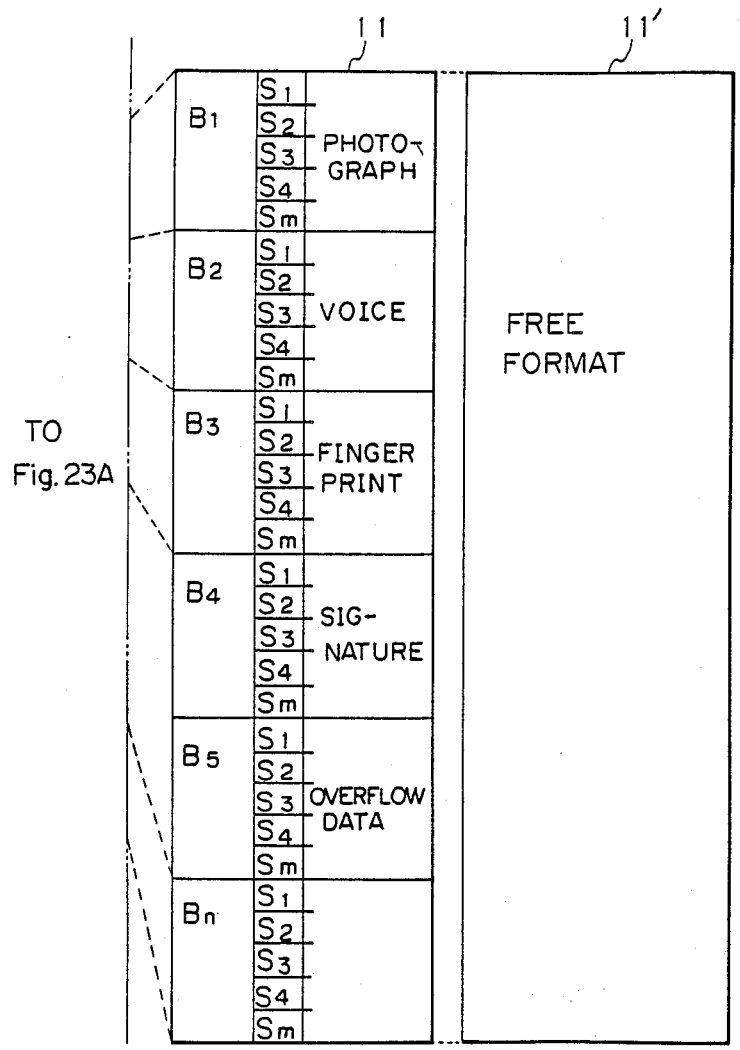

FIGS. 23A and 23B show a specific arrangement of a memory history management part shown in FIG. 22. The data files in the external memory may be used with a regulated format as shown by 11 in FIG. 23B or a free format a shown by 11'. In the external memory (EMEM) 11' (left side in FIG. 23B) is regulated with a plurality of blocks, such as $B_1$, $B_2$-$B_n$. In the example, block $B_1$ is allotted to the photograph data, $B_2$ to the voice data, $B_3$ to the fingerprint data, $B_4$ to the signature data, and $B_5$ to the overflow data from the internal memory (IMEM) 5. Each of the blocks $B_1$ through $B_n$ is composed of a plurality of sections $S_1$ through $S_m$.

On the other hand, as shown in FIG. 23A, the internal memory (IMEM) 5 contains therein the memory history directory 71 and the history record area 72, as the memory history management part 70 (FIG. 22). The memory history directory 71 indicates physical addresses on the external memory (EMEM) 11. The history record area 72 is divided with a plurality of rows, and each row is predefined by both block numbers $B_1$, $B_2$–$B_n$ and section numbers $S_1$, $S_2$–$S_m$. Therefore, each time a write operation to the blocks $B_1$ through $B_n$ of FIG. 23B is carried out, the date on which the related write operation was made is recorded in the corresponding row of the history record area 72. (FIG. 23A).

Figure 24B:
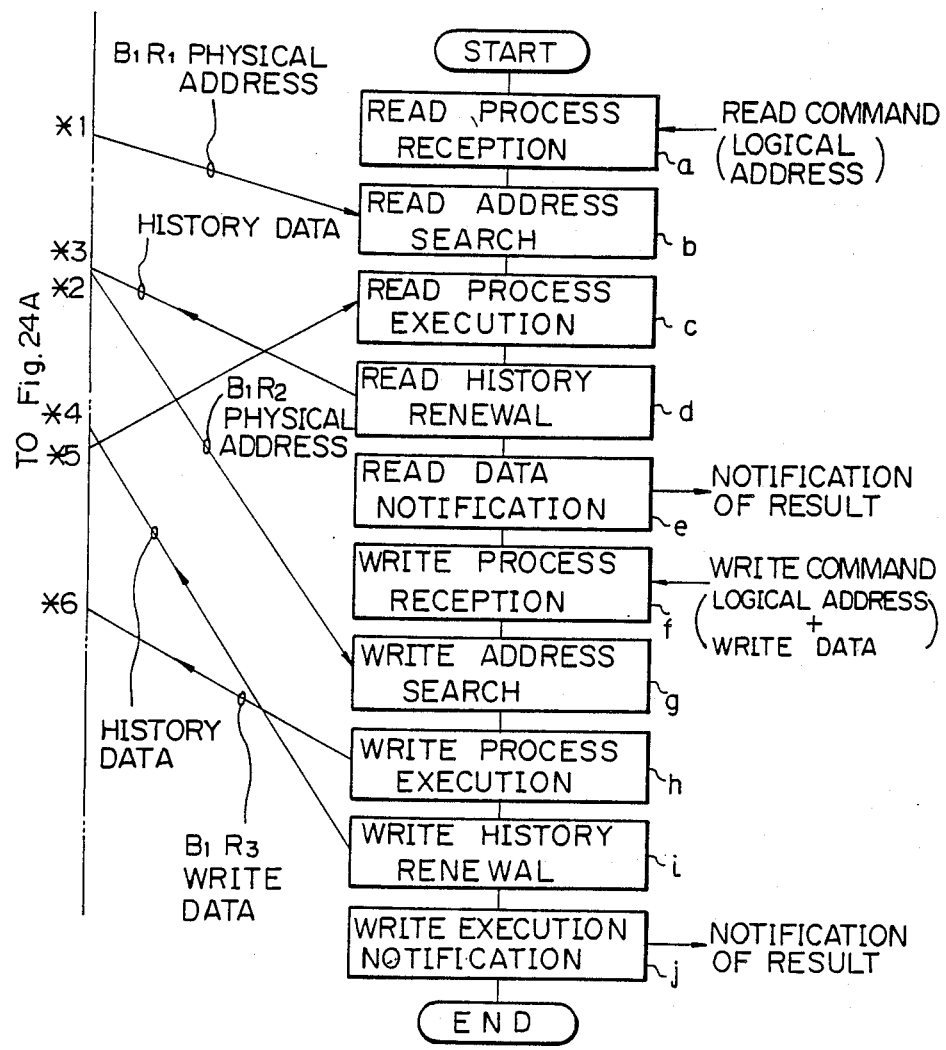

FIGS. 24A and 24B are a flow chart of the read and write operations to an external memory (EMEM), and also depict an arrangement of the related memories. The content of FIG. 24A is substantially the same as the content shown in FIGS. 23A and 23B. The processing flow of FIG. 24B is programmed in the external memory access means (EMAM) 23 in FIG. 23A and the program is executed by the external IC card acceptance means 20 (terminal machine) and, if necessary, the terminal station 30. The communication is handled by the reader-writer and the reading and writing device.

When a read command and the corresponding logical address are sent from the acceptance means 20, a read operation is started by the processor (CPU) 4 in the IC card 10 (refer to "a" in FIG. 24B). This command is a request to scan the history, and thus a corresponding search in the history directory 71 is carried out ("b") and the physical address corresponding to the searched logical address is found. Using the found physical address, data is read from the EMEM 11 by the acceptance means 20 ("c"), and thereafter, the date on which the related read operation was carried out is written in the history directory 71 by the CPU 4 ("d"). The thus read data is sent to a demander of the related read request, e.g., the terminal station 30, by the acceptance means 20 ("e").

When a write command, the corresponding physical address, and the corresponding write data are received by the CPU 4 ("f"), the CPU 4 (FIG. 23A) carries out a search of the history directory 71 using the given logical address, to find the corresponding physical address ("g"). Based on the found physical address, the related write operation is carried out by the acceptance means 20 ("h"), and thereafter, the date on which the write operation was carried out is recorded by the CPU 4 ("i"). The result of the write operation is sent to the demander of the relate write request, e.g., the terminal station 30, by the acceptance means 20 ("j").

As explained above in detail, the IC card of the present invention can handle a vast amount of data compared to the conventional IC card 1. Although the external memory (EMEM) is exposed outside the body of the IC card, security for the data stored therein can be assured because the EMEM is governed by the own CPU alone.

I claim:

1. An IC card comprising:
   a processor contained therein and communicating with an external IC card acceptance means;
   an internal memory contained in the IC card, cooperating with the processor and forming data files;
   an external memory mounted on a surface of a body of the IC card, said internal memory including:
   first files allotted to said external memory;
   second files allotted to said internal memory; and
   a first directory for defining said first files allotted to said external memory; and
   an external memory access means, other than an internal memory access means, formed by said processor, said external memory access means alone can access said external memory by way of said external IC card acceptance means, said external memory access means established by a program and said internal memory access means established by a program, both programs being stored in a program ROM provided by said processor in the IC card.

2. An IC card as set forth in claim 1, wherein said internal memory further comprises a second directory for defining said second files allotted to said internal memory.

3. An IC card as set forth in claim 2, wherein a first logical system comprising both said processor and said external memory is isolated from a second logical system comprising both said processor and said internal memory.

4. An IC card as set forth in claim 3, wherein said first logical system and said second logical system are isolated from each other, but can be logically connected by way of said external IC card acceptance means.

5. An IC card as set forth in claim 4, wherein only data managed by said processor is sent to said external memory.

6. An IC card as set forth in claim 5, wherein read and write operations for said external memory are carried out by using only addresses handled by said processor.

7. An IC card as set forth in claim 6, wherein address holding means is employed and realized by said internal memory and said address holding means specifies a new area in said second file with reference to a vacant area in said first directory.

8. An IC card as set forth in claim 7, wherein a cryptograph management information memory means is further employed and realized by said internal memory, and operates to encipher and decipher data to be communicated between said processor and said external memory.

9. An IC card as set forth in claim 8, wherein said IC card acceptance means includes a reader-writer for contacting both said processor and said internal memory and is provided with a reading and writing device for contacting said external memory.

10. An IC card as set forth in claim 9, wherein said IC card has a security function and includes said external memory, said address holding means for holding addresses of the files stored in said external memory, said cryptograph management information memory means for storing the cryptograph management information used for ciphering data and for deciphering the ciphered data, write processing means, first read processing means, and second read processing means,
   said write processing means starting operation upon receipt of a write command and the corresponding write data, enciphering the received write data with reference to said crytographic management information, searching the corresponding address of said external memory at which the enciphered write data is to be written with reference to said address holding means, and sending the enciphered write data and the corresponding address, as a response, said first read processing means starting operation upon receipt of a first read command and a corresponding file number of said file in said external memory, searching the corresponding read address specified by the given file number with reference to said address holding means, and sending the read address as a response, and said second read processing means starting operation upon receipt of a second read command and enciphered read data, deciphering the received enciphered read data with reference to said cryptographic management information, and sending the deciphered read data as a response.

11. An IC card as set forth in claim 10, wherein said external IC card acceptance means cooperates, when said processor is to perform a write operation, with said IC card, so that (I) a given write command and corresponding write data are input to said IC card, (II) enciphered write data and the corresponding address for writing in said external memory are obtained and output from said IC card, and (III) the enciphered write data is written in said external memory.

12. An IC card as set forth in claim 10, wherein said external IC card acceptance means cooperates, when said processor is to perform a read operation, with said IC card, so that (I) a given first read command and corresponding file number are input to said IC card, (II) the corresponding read address for said external memory is searched by said address holding means and output from said IC card, (III) enciphered read data is obtained by using the read address searched from said external memory, (IV) the enciphered read data from said external memory is sent to said IC card together with a second read command, and (V) deciphered read data is output from said IC card in response to the second read command.

13. An IC card as set forth in claim 2, wherein said first files and said second files store user data related to an IC card owner.

14. An IC card as set forth in claim 13, wherein said first files further include a password area used for an authentication check of said external memory by said processor.

15. An IC card as set forth in claim 2, wherein a memory history management part is further included in said internal memory and manages information to be stored in said external memory.

16. An IC card as set forth in claim 15, wherein said memory history management part is includes at least a memory history directory formed in said first directory of said internal memory.

17. An IC card as set forth in claim 16, wherein a history record area is formed in said first files and cooperates with said memory history directory, both said memory history directory and said history record area being controlled by said processor.

18. An IC card as set forth in claim 17, wherein a first logical system formed by both said processor and said external memory is isolated from a second logical system formed by both said processor and said internal memory including said memory history management part.

19. An IC card as set forth in claim 18, wherein said first logical system and said second logical system are isolated from each other, but can be logically connected by way of said external IC card acceptance means.

20. An IC card as set forth in claim 19, wherein only data managed by said processor is sent to said external memory.

21. An IC card as set forth in claim 20, wherein said history record area records at least a date on which a read or write operation was carried out from or to said external memory.

22. An IC card as set forth in claim 21, wherein said memory history directory holds an index of each history data in said history record area and the corresponding write data in said external memory.

23. An IC card as set forth in claim 22, wherein said write data to be indexed by said memory history directory is data such as a photograph of a face, a voice, a fingerprint, and a signature of the IC card user, and data which overflows from said internal memory due to a lack of memory capacity.

24. An IC card as set forth in claim 2, wherein said internal memory comprises a non-volatile memory such as an electronically erasable programmable read only memory (EEPROM).

25. An IC card as set forth in claim 1, wherein said external memory has a larger memory capacity than that of said internal memory.

26. An IC card as set forth in claim 25, wherein said external memory is composed of an optical memory such as one of a laser memory, a CD-ROM, or similar optical memories.

* * * * *